(12) United States Patent
Khalaf

(10) Patent No.: US 6,373,161 B1
(45) Date of Patent: Apr. 16, 2002

(54) PERIODIC AIR GAP ELECTRIC GENERATOR

(76) Inventor: Majid Z. Khalaf, 1817 S. Harlem, Apt. 8, Berwyn, IL (US) 60402

( * ) Notice: Subject to any disclaimer, the term of this patent is extended or adjusted under 35 U.S.C. 154(b) by 0 days.

(21) Appl. No.: 09/565,719

(22) Filed: May 5, 2000

(51) Int. Cl.$^7$ ............................ H02K 21/04; H02K 1/17
(52) U.S. Cl. .................. 310/154.02; 310/74; 310/152; 310/153; 310/154.21; 310/254; 310/261
(58) Field of Search ................................ 310/152, 153, 310/74, 156, 154, 155, 254, 261

(56) References Cited

U.S. PATENT DOCUMENTS

| | | | | |
|---|---|---|---|---|
| 2,553,298 A | * | 5/1951 | Brunelle et al. | 310/155 |
| 2,718,603 A | * | 9/1955 | McLean | 310/155 |
| 3,322,984 A | * | 5/1967 | Anderson | 310/155 |
| 3,648,724 A | | 3/1972 | Lloyd | 137/467 |
| 3,775,684 A | * | 11/1973 | Hoodwin | 324/162 |
| 3,914,804 A | | 10/1975 | Schrader et al. | 4/7 |
| 3,960,466 A | | 6/1976 | Taylor | 417/234 |
| 3,961,214 A | * | 6/1976 | Lokkart | 310/155 |
| 4,092,984 A | | 6/1978 | Bindel | 128/229 |
| 4,178,931 A | | 12/1979 | Lind et al. | 128/230 |
| 4,428,507 A | | 1/1984 | Sneider | 222/105 |
| 4,639,626 A | * | 1/1987 | McGee | 310/155 |
| 5,946,741 A | | 9/1999 | Moon | 4/420 |
| 6,262,508 B1 | * | 7/2001 | Shibayama et al. | 310/181 |

* cited by examiner

Primary Examiner—Burton S. Mullins
(74) Attorney, Agent, or Firm—Philip H. Kier

(57) ABSTRACT

A rotating machine that can generate standard AC, high-frequency AC, or DC electricity by non-conventional means. The method involves changing the air gap between a pole of a stationary magnet and a ferromagnetic member on a rotating disk-like flywheel. Each time the distance of the air gap changes from a maximum to a minimum and back to a maximum, half a cycle of magnetic flux is produced in the circuit of the magnet. A conductor coil is wound around the magnet so that the half cycle of magnetic flux produces a half cycle of EMF in the conduction coil. The flywheel contains non-magnetic material as well as ferromagnetic material, which may be in the form of discrete bars or be shaped like a gear. The type of electricity produced (AC or DC), whether single phase or poly-phase electricity is produced and the number of EMF cycles per rotation of the flywheel depend on the number of stationary magnets and associates coils, the number of ferromagnetic bars or gear teeth on the flywheel, the direction winding of the coils, and whether the coils are connected in series or parallel. As many as 100 EMF cycles can be generated from one rotation of the flywheel. As the flywheel can be attached to a shaft that rotates because of falling rivers, tides, or wind, this revolving machine can harness such low intensity, renewable energy sources.

17 Claims, 9 Drawing Sheets

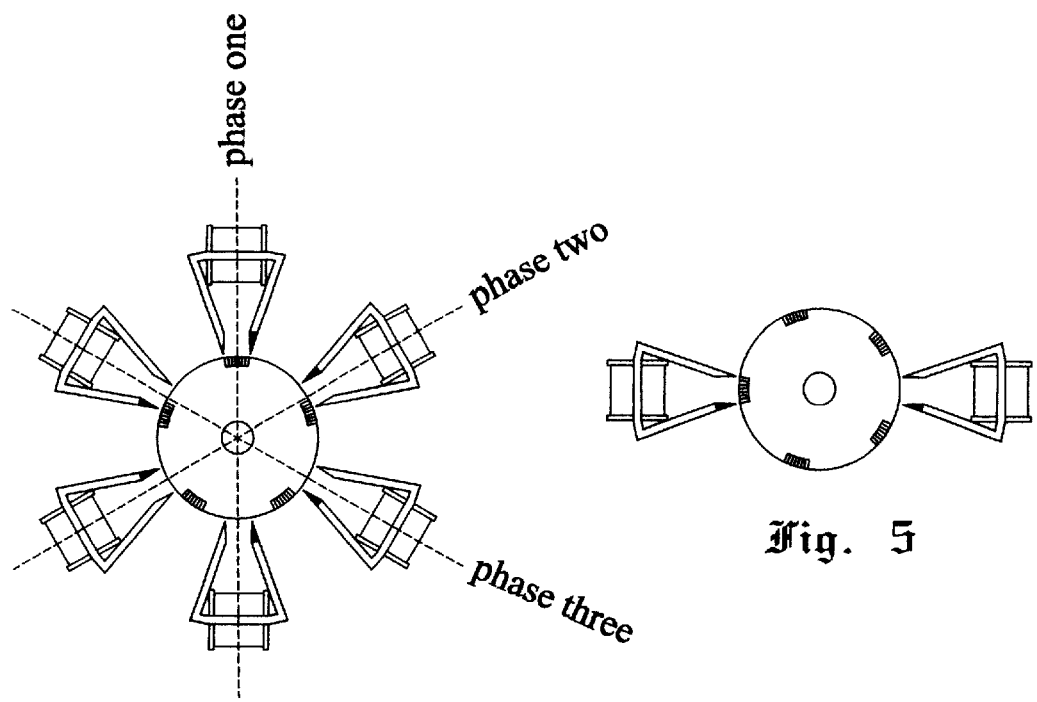
Fig. 4
Fig. 5
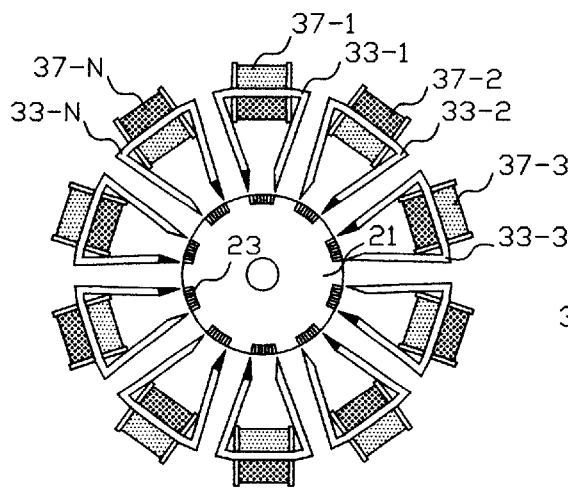
Fig. 6
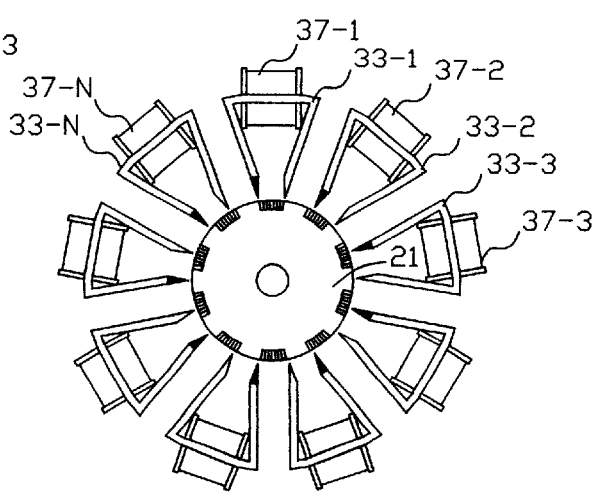
Fig. 7

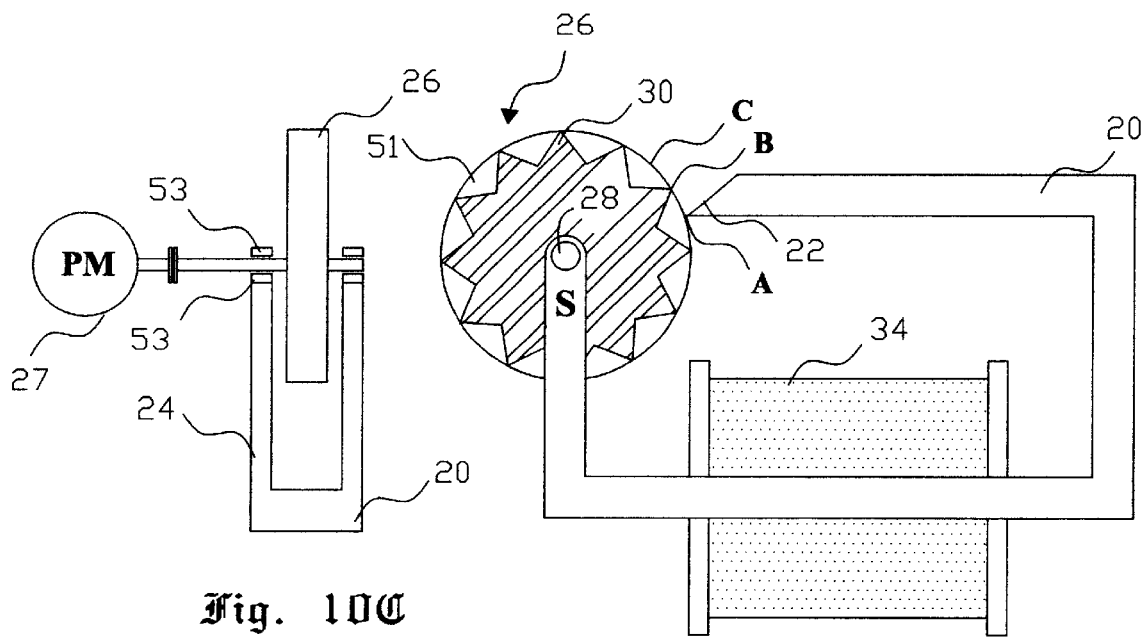
Fig. 10C
Fig. 10B
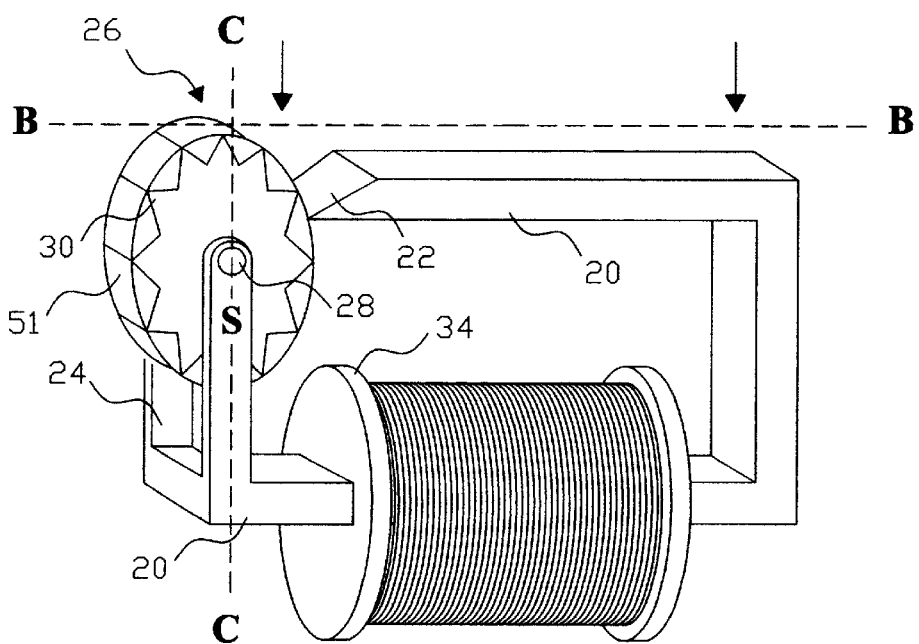
Fig. 10A

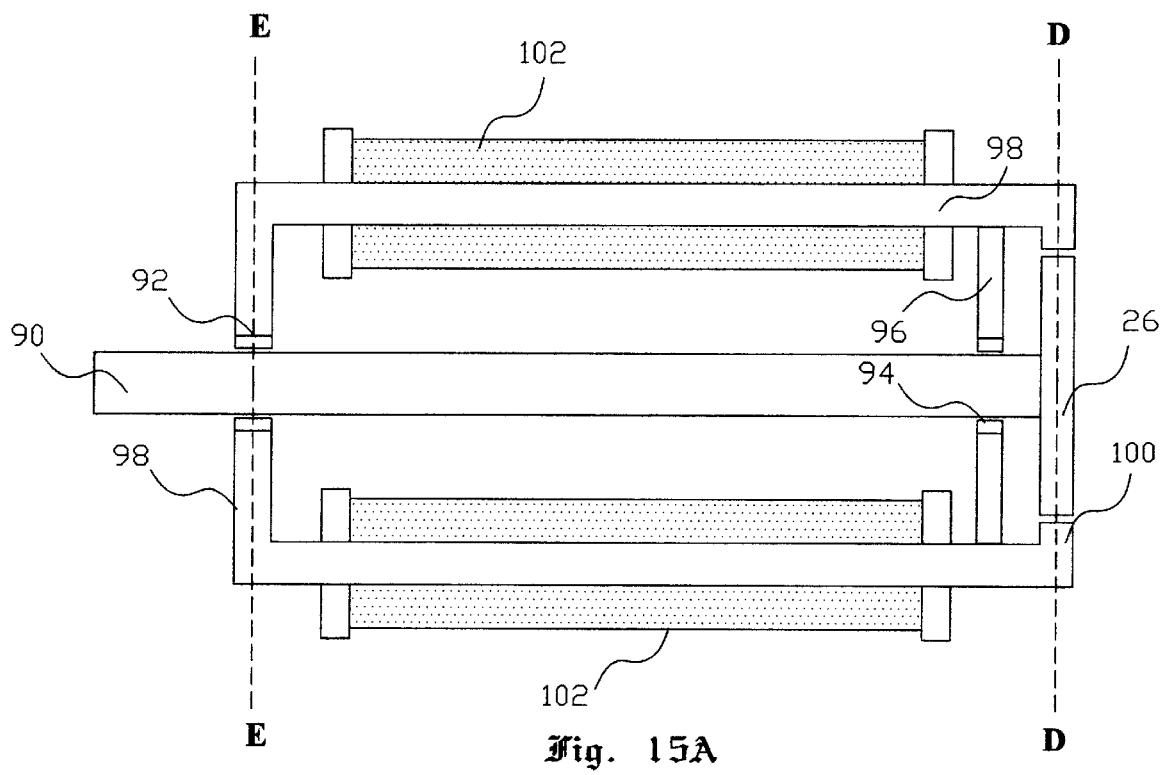
Fig. 15A
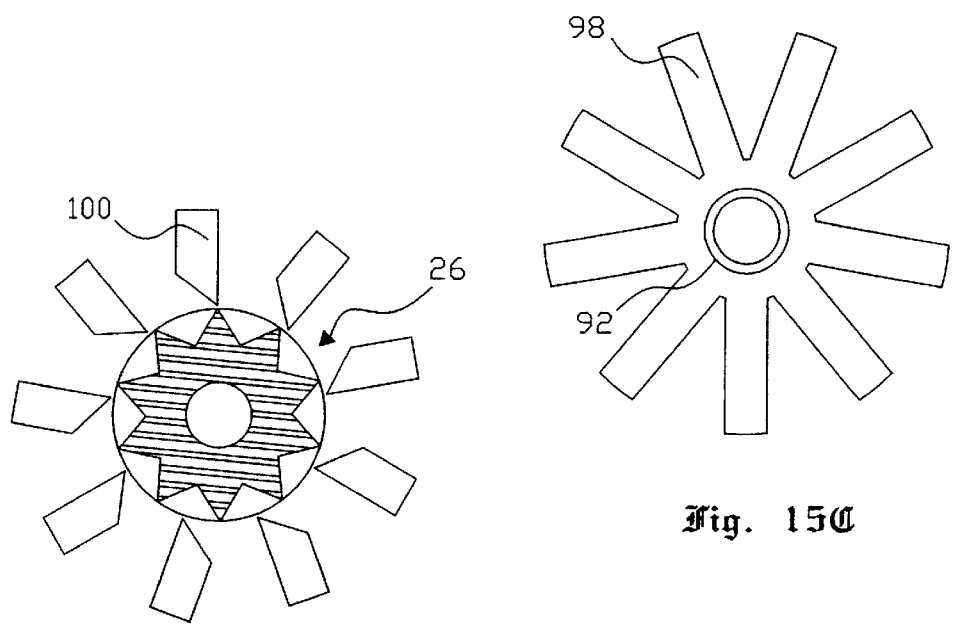
Fig. 15B
Fig. 15C

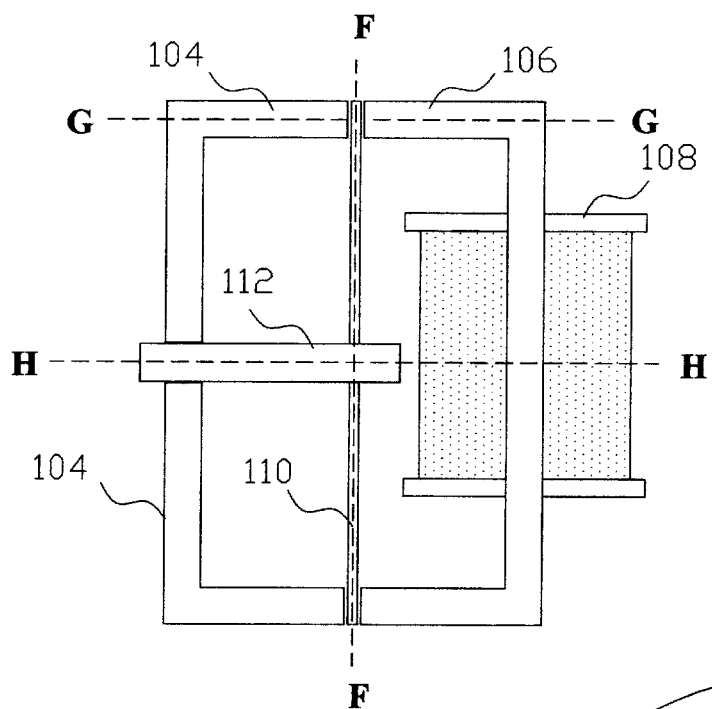
Fig. 16A
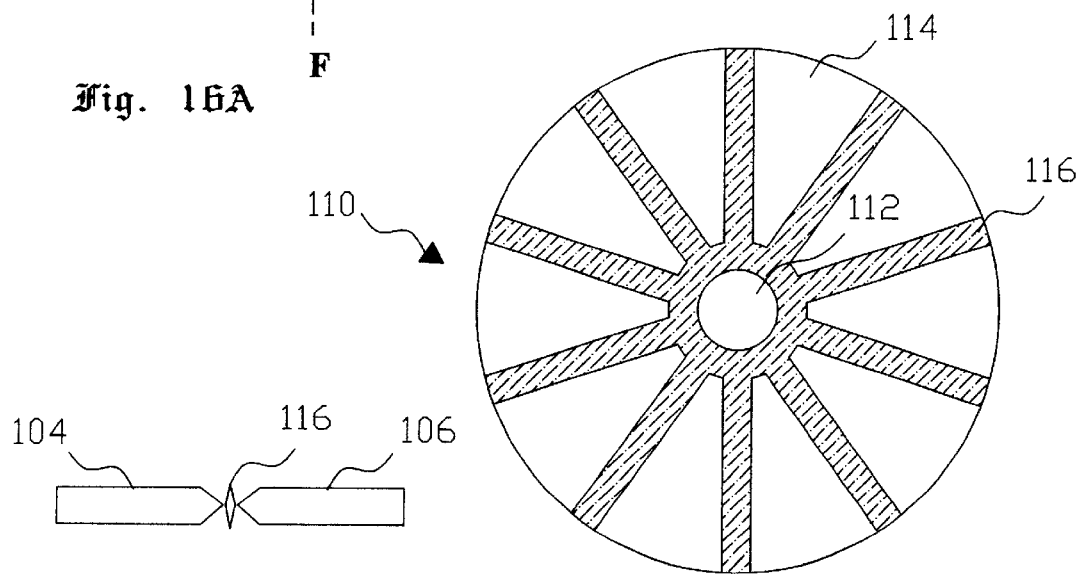
Fig. 16C
Fig. 16B

PERIODIC AIR GAP ELECTRIC GENERATOR

BACKGROUND

The present invention is related to electric generators, devices that convert mechanical energy to electrical energy. More particularly, the present invention includes a rotor that contains a plurality of ferromagnetic sections imbedded in a non-magnetic medium and a stator containing both a plurality of magnets and conductor coils. Depending on the number of magnets and conductor coils in the stator, the number of magnetic sections in the rotor, alternating current (AC) electricity or direct current (DC) electricity is generated. The frequency of AC electricity generated is an integral multiple of the rotational frequency of the rotor and high frequencies can be attained.

Conventional electric generators rely on relative rotation between a magnetic field and electric conductor coils. The magnetic field may be stationary and the electric conductor coils revolve through it; or vice versa. To generate AC electricity with a frequency of 60 Hz, the rotor needs to rotate 60 cycles per second if the magnet has two poles or 30 cycles per second if two magnets have four poles. One method to increase the production of electrical energy from a generator is to increase the rotational speed of the rotor and then pass the resulting current through frequency and voltage controllers to adjust the frequency and voltage to standard values (e.g., 10 volts, 60 Hz). If a diesel or another type of engine is used to produce high rotational speeds, the engine may experience accelerated wear and tear, or there may be other damage. Also, in an electric generator, an average of two percent of the mechanical and electrical energy is converted to heat and consequently conventional high power generators require extensive and expensive heat removal systems.

The configuration in the present invention with stationary magnets and conductor coils has several advantages. One is that this configuration has simple and inexpensive construction, e.g. an external frame is not necessary. Another advantage is that it can be cooled simply and inexpensively by, for example, immersing both the conducting coils and magnets in cooling oil.

The present invention can also be used to produce DC electricity with a wide range of voltage and power without use of brushes, rectifiers, or commutators. Various types of DC generators have been disclosed in U.S. patents. U.S. Pat. No. 5,977,584 to Lin discloses a rotating machine that produces low voltage and power for applications such as recharging batteries and that whose function can be reversed to operate as a motor. U.S. Pat. No. 5,334,898 to Skybyk discloses high-density discoidal brushless induction open frame motor and generator with multistacking, multiphasing and multistaging capability. U.S. Pat. No. 5,278,470 to Neag discloses a homopolar machine that can produce high voltage DC electricity with limited power capability. U.S. Pat. No. 4,780,659 to Bansal and Krinickas discloses a high-power, high-voltage DC power supply containing a plurality of AC generators mounted on one rotator shaft, all AC generators being connected through multiple rectifier units.

DC generators found in the prior art tend to generate electricity in a conventional way and suffer from one or more of several disadvantages. The disadvantages include low voltage, low power, limited applications, complicated structure, expensive operational costs (including cooling costs), the need for rectifiers and filters, and the needs for high rotational speeds. As will be described later, the present invention provides a DC generator capable of producing a wide range of voltages and powers with a simple and inexpensive structure (commutators, brushes, and rectifiers are not used) and operations.

The present invention in an AC configuration produces AC electricity with frequencies that are integer multiples of the rotational speed of its rotor without the use of gears. Therefore, it is well suited for producing reliable electricity from energy sources that produce relatively slow rotation. One such energy source is wind energy. Usually, wind speed is too low to cause a wind turbine to rotate at even 10 cycles per second. Consequently, conventional wind generators use gears to increase the rotational speed of their rotors and pay the price in reduced efficiency. Other such sources are tidal energy, and low-head hydroelectric power in rivers. Electricity could be generated efficiently with the present invention from falls in rivers or from differences in elevations in tides as small as two meters in height. With use of multiple generators, the energy potential of low-head hydro can be used without the expense, and possible adverse environmental effects of building large dams. Also even a small generator could be energized by the flow of river current.

Accordingly, there are several objects and advantages of the present invention. One object is to provide an inexpensive electric generator of simple construction and with a simple cooling system. Another object is to provide an electric generator with a rotating magnetic field with a frequency of rotating much higher than the frequency of rotation of its mechanical rotor so that a wide range of power outputs and AC frequencies can be achieved. Another object is to provide an electric generator that can be built in different ways according to the availability of space, the types of current needed and the nature of the prime mover energy.

A further object is to provide an AC electric generator that can produce frequencies in excess of 10,000 Hz with a power output as high as available from conventional electric generators. A further objective of the present invention is to provide a simple and inexpensive DC electric generator capable of providing high power steady DC electricity or DC with minimal high frequency ripple and without use of commutators or brushes. A still further object is to provide a means of generating electricity from slow rotational motions associated with winds, tides, falling river water, and river current.

SUMMARY

The present invention achieves the above objectives by providing a rotating magnetic field with a frequency many times greater than the rotational frequency of its mechanical rotor because there is no relative mechanical movement between magnets and the electrical conductors. The invention includes a plurality of stationary units arrayed around a flywheel, or rotor, mounted on a rotating shaft energized by the prime mover. Each unit contains a magnet with a north pole and a south pole and a conducting coil. To reduce unnecessary magnetic flux, the magnets are oriented such that the north pole of one magnet is next to the north pole of one adjacent magnet and the south pole of the magnet is adjacent to the south pole of the other adjacent magnet (alternating orientation). The flywheel made of a non-ferromagnetic material with imbedded ferromagnetic material. In the primary embodiment of the invention, U-shaped magnets tapered to a sharp edge at the poles are used and the ferromagnetic material is in the form of bars imbedded in the periphery of the flywheel. The primary determinant of the character of the electricity produced are: (1) the relationship between the number of magnets and the number of ferromagnetic sections; and (2) the positioning of the magnets.

There is an air gap between the poles of magnets and the ferromagnetic sections. The width of the air gap depends on the angle of rotation of the flywheel relative to the stationary magnets. Each time, a ferromagnetic bar passes the poles of a magnet in the primary embodiment, the air gap passes from a maximum to a minimum and back to a maximum to produce one half of an electric cycle. When the air gap is decreasing, magnetic flux increases in the circuit of the magnet and when the air gap is increasing, the magnetic flux decreases. Hence for every two ferromagnetic bars that pass the poles of a magnet, one complete cycle of the magnetic flux results, which induces one complete cycle of electro motive force (EMF) in the conductor coils wound about the magnets. For a DC generator, the EMF cycle (two pulses) frequency is:

Frequency=number of bars in the flywheel×rotational frequency of the flywheel/2

For an AC generator, the EMF frequency is:

Frequency=number of bars in the flywheel×rotational frequency of the flywheel

A generator with one magnet or with a number of the magnets the same or an integer multiple of the number of ferromagnetic sections and with the ferromagnetic sections passing the poles of the magnet(s) at same time can produce pulsing DC electricity as the flywheel rotates. A generator with multiple magnets which are less or more than the number of the ferromagnetic sections, but not integer multiples, can produce steady DC electricity if all conduction coils are connected in series and can produce high frequency ripple DC electricity if all conduction coils are connected in parallel through multiple diodes. The above results can be achieved if all magnets are arrayed equidistant around the flywheel with same orientation (of magnet poles) and direction of winding of conduction coils or alternating orientation and alternating direction of winding of conduction coils.

A generator with a number of magnets that is an even multiple of the ferromagnetic sections where the magnets have alternating orientation and the same direction of winding of the conduction coils can produce standard or high frequency, single or poly-phase AC electricity. The same result can be obtained if all magnets have the same orientation with alternating directions of winding of the conduction coils.

BRIEF DESCRIPTION OF THE DRAWINGS

FIG. 4 is a cross sectional view of an alternative embodiment of a three-phase AC generator one stator-rotor unit.

FIG. 5 is a cross sectional view of an alternative view of a single phase AC generator with only two magnets.

FIG. 6 is a cross sectional view of a pulsing DC generator with magnets having alternating orientations and alternating directions of conduction coil windings.

FIG. 7 is a cross sectional view of a steady current DC generator or a DC generator with high frequency ripple with all magnets having the same orientation.

FIG. 10A is a perspective view of an embodiment of a DC generator with one magnet and with the shaft of the rotor joined to one pole of the magnet.

FIG. 10B is a cross sectional view of the embodiment of a DC generator shown in FIG. 10A taken along line B—B of FIG. 10A.

FIG. 10C is a cross sectional view of the embodiment of a DC generator shown in FIG. 10A taken along line C—C of FIG. 10A.

FIG. 15A is a cross sectional view of an alternative embodiment of a DC generator with L-shaped magnets aligned parallel to the shaft of the flywheel.

FIG. 15B is a cross sectional view of the alternative DC generator embodiment shown in FIG. 15A along line D—D in FIG. 15A.

FIG. 15C is a cross sectional view of the alternative DC generator embodiment shown in FIG. 15A along line E—E in FIG. 15A.

FIG. 16A is a cross sectional view of an alternative embodiment of a DC generator with a U-shaped magnet and a ferromagnetic frame.

FIG. 16B is a cross sectional view the alternative embodiment of the DC generator shown in FIG. 16A along line F—F in FIG. 16A.

FIG. 16C is a cross sectional view the alternative embodiment of the DC generator shown in FIG. 16A along line G—G in FIG. 16A.

DETAILED DESCRIPTION OF THE INVENTION

The operation of this invention is based on two fundamental laws of electromagnetic induction. One, Rowland's Law provides that the magnetic flux, $\phi$, in a magnetic circuit is equal to magnetic motive force divided by the reluctance of the magnetic circuit, where this reluctance depends on the air gap between components of the magnetic circuit. The second fundamental law is Faraday's Law that provides that electromotive force (EMF) is equal in magnitude to and opposite in algebraic sign to the time rate of change of magnetic flux. That is: EMF=−dϕ/dt, where t is time.

Figure 1:
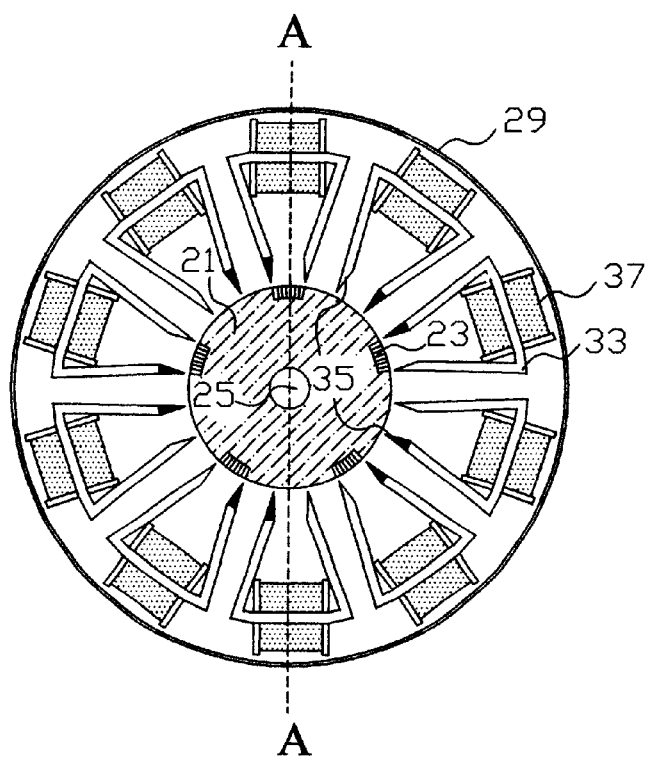
FIG. 1 is a cross sectional view of the main embodiment of the single phase AC generator.
Figure 2:
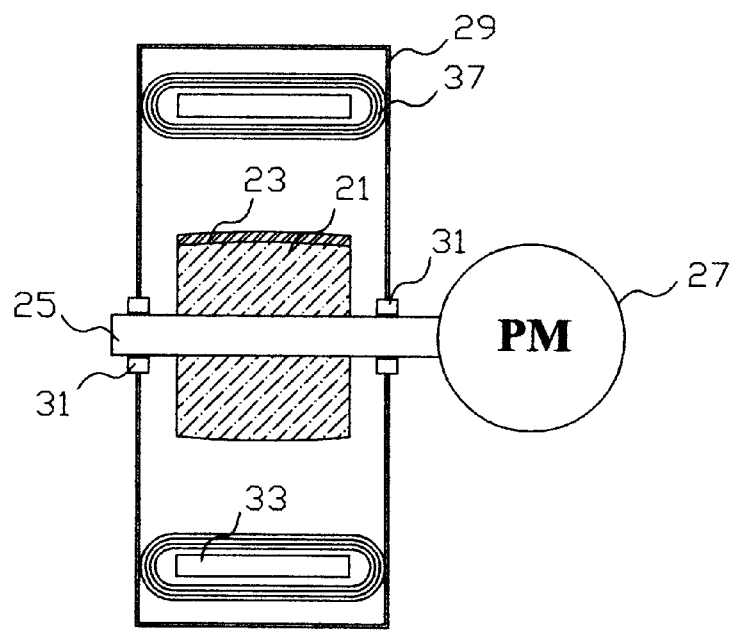
FIG. 2 is a cross sectional view of the main embodiment of the single-phase AC generator taken along line A—A in FIG. 1.

With reference to FIG. 1 and FIG. 2, the main embodiment of a single-phase AC generator contains a disk-shaped flywheel, or rotor, 21 attached to a shaft 25. The shaft, in turn, communicates with a prime mover 27. The flywheel is made of a non-ferromagnetic material. Imbedded in the flywheel 21, at its periphery, are a plurality of ferromagnetic bars 23 that extend the entire width of the flywheel. The outer surface of the ferromagnetic bars have the same circular curvature as the surface of the flywheel. The ferromagnetic bars are equally spaced on the periphery of the flywheel. Arrayed axially around the flywheel 21 is a stationary member, or stator, containing a plurality of equally spaced U-shaped magnets 33. Wound around each magnet is a conduction coil 37. The poles 35 of the magnets are tapered to sharp edges. The angular distance between the poles of a magnet is the same as the angular distance between the ends of a ferromagnetic bar. Also, the angular distance between poles of a magnet is equal to the distance between the poles of adjacent magnets. Thus the angular distance between magnets is equal to 360° divided by twice the number of magnets. To produce AC electricity with this configuration, the number of magnets 33 is twice the number of ferromagnetic bars 23, or in general an even multiple of the number of ferromagnetic bars. Also, the orientation of the magnets alternate. That is, the north pole of one magnet is next to the north pole of one adjacent magnet and the south pole of that magnet is next to the south pole of the other adjacent magnet pole, In the embodiment shown in FIG. 1, there are five ferromagnetic bars and ten magnets with alternative orientations with the angular distance between adjacent magnets being 180. The shaft 25 is jointed to a frame 29, which encloses the flywheel and stator through a pair of bearing sets 31.

As flywheel 21 rotates, the size of the air gap between a ferromagnetic bar and a pole of a magnet changes. When a ferromagnetic bars move toward a pole of a magnet, the size of the air gap will decrease from a maximum to a minimum and will convert the circuit of the magnet from open to semi-closed. The magnetic flux will change from low to high and induce growing EMF in the conduction coil magnet wound around the magnet. When a ferromagnetic bar moves away from the poles of a magnet, the air gap will change from a minimum to a maximum, the circuit of the magnet will convert from semi-closed to open, and a declining EMF will be induced in the coils. In the orientation shown, EMF will be induced in five magnets with the same polarity as the five ferromagnetic bars rotate a tenth of a flywheel cycle. During rotation of the flywheel through the second tenth cycle, EMF will be induced in the five magnets with the opposite polarity. Accordingly, if all of the coils are connected in series, alternating positive and negative polarity EMF will be induced, i.e., single-phase, alternating current electricity, Since a single AC cycle is produced by rotation of the flywheel through 72°, complete rotation of the flywheel through 360° will produce 5 cycles of AC electricity. In general the frequency of the AC electricity in Hz is equal to the number of ferromagnetic bars multiplied by the number of rotations of the flywheel per second.

Figure 3A:
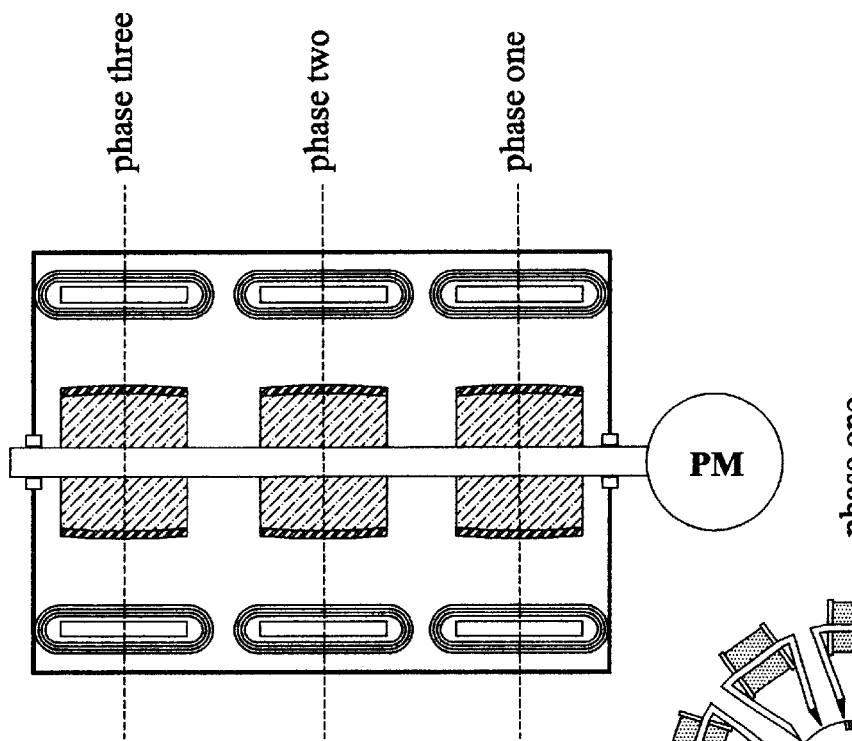
FIG. 3A is a cross sectional view of a three-phase generator showing three units of magnets and conductor coils.
Figure 3B:
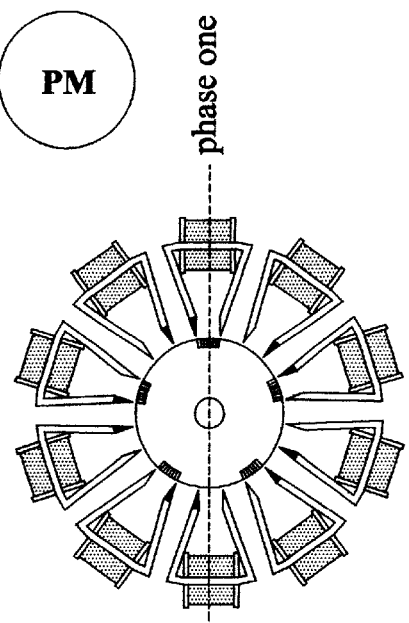
FIG. 3B is a cross sectional view of a unit of magnets and conductor coils that produces one phase for the three-phase AC generator.
Figure 3D:
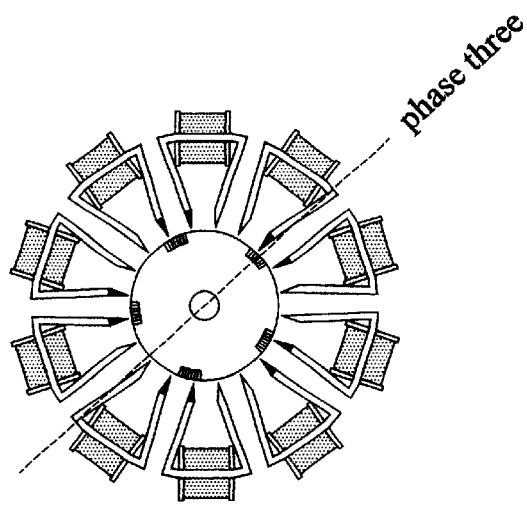
FIG. 3D is a cross sectional view of a unit of magnets and conductor coils that produces a third phase for the three-phase AC generator.
Figure 3C:
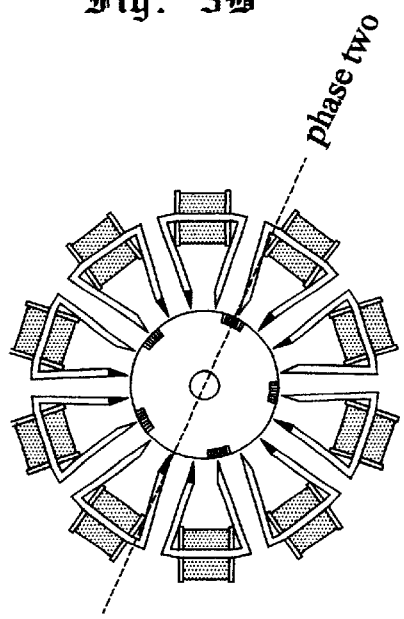
FIG. 3C is a cross sectional view of a unit of magnets and conductor coils that produces a second phase for the three-phase AC generator.

One phase of AC electricity is produced by having one unit, that is, a stator with magnets and conduction coils arrayed around a flywheel, on a rotating shaft. Poly-phase AC electricity can be produced by have multiple units on a rotating shaft. The embodiment shown in FIG. 3A through FIG. 3D can be used to produce three-phase electricity. FIG. 3A shows that there are three units on the same shaft. FIG. 3B shows the orientation of the unit used to produce one phase. In this figure, the gap between poles of the top magnet and a ferromagnetic bar is a minimum. FIG. 3C shows the orientation of the unit used to produce the second phase. For this unit the stator is oriented on the shaft such that there is a rotation of 24° in the position of the ferromagnetic bars relative to the magnets. In FIG. 3D, for the unit used to produce the third phase, there is an addition rotation of 24° in the position of the ferromagnetic bars relative to the magnets. In this embodiment with multiple units on a single shaft, the same rotation of the shaft produces one AC cycle in each unit. Therefore, the angular rotation of the stator relative to the ferromagnetic bars is the angular rotation needed to produce one cycle divided by the number of phases. With five ferromagnetic bars and three phases, the angular rotation is 72/3 or 24°.

In the embodiment shown in FIG. 4, three-phase AC electricity is generated with one unit of magnets and a flywheel. In this type of embodiment, the number of sets of magnets equals the number of phases and each set of magnets contains at least two magnets with opposite orientations. If n is the angular length of a ferromagnetic bar, the angular distance between sets of magnets should be an integral multiple of n plus n divided by the number of phases. This is a limitation on n. In FIG. 4, with 5 ferromagnetic bars, n is 18°. There are three sets of magnets displaced by 60° from one another. 60° is 3×18+18/3. FIG. 5 shows an embodiment that uses one set of two magnets with opposite orientation to produce single-phase AC electricity.

Pulsing DC electricity can be produced with different orientations of magnet poles or coil windings than used on the AC generators described above. FIG. 6 shows an embodiment that can produce pulsing DC electricity. In this embodiment the number of magnets 33 is the same as the number of ferromagnetic bars 23. The orientation of the magnets should alternative so that a north pole (e.g., of magnet 33-2) is adjacent to a north pole (of magnet 33-3) and the south pole is adjacent to a south pole (of magnet 33-1). Also, the winding of the conduction coils associated with adjacent magnets are in opposite directions. In addition, the length of the outer surface of the ferromagnetic bars 23 is the same as the distance between poles of a magnet. When flywheel 21 rotates, a pulsing DC EMF is induced in all coils 37 simultaneously. If all such coils are connected in series, a voltage equal to the product of the voltage in one coil and the number of coils will result. The frequency (f) of the cycles (two pulses) will be:

$$f = \text{number of ferromagnetic bars} \times \text{rotational freq. of flywheel}/2$$

Figure 9:
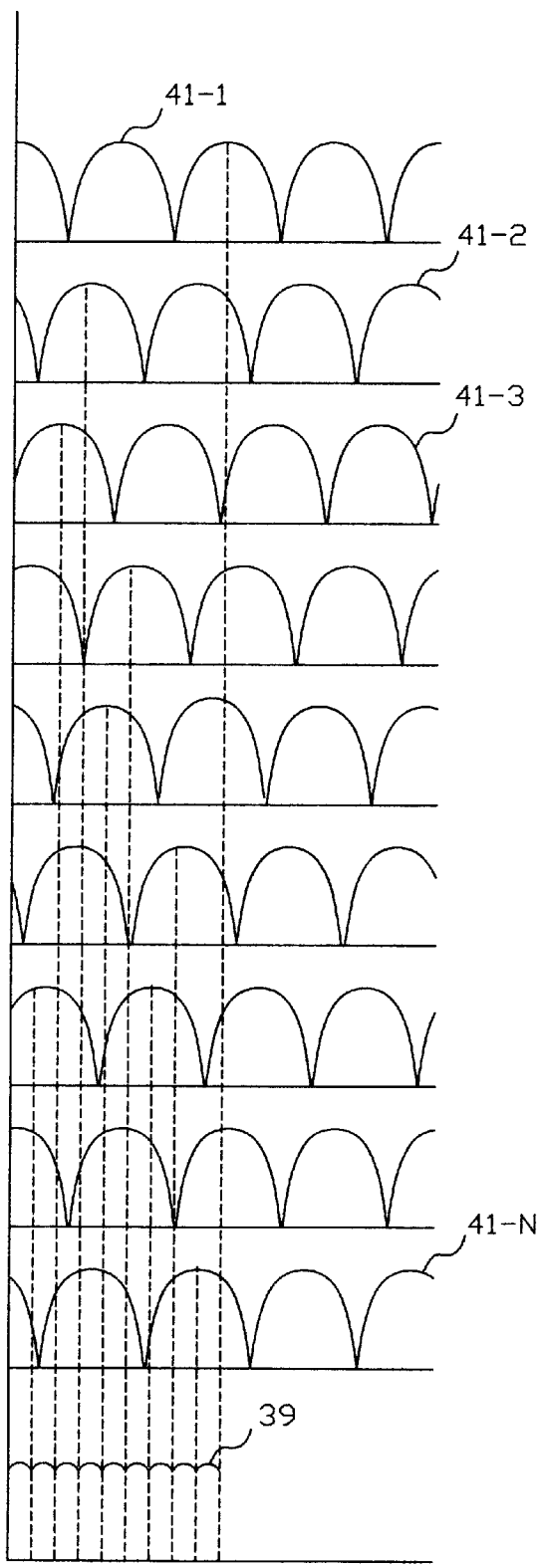
FIG. 9 is a diagram illustrating the waveform of each conductor coil, the time relationship between them, and the final wave form for the generator shown in FIG. 7.
Figure 8:
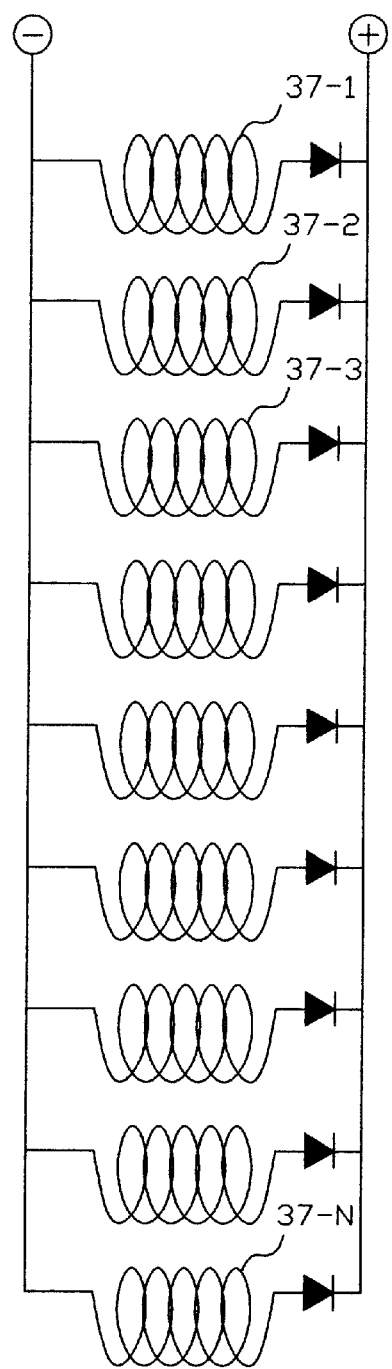
FIG. 8 is a schematic diagram of a DC generator showing nine conductor coils connected in parallel through nine diodes for the generator shown in FIG. 7.

FIG. 7 shows an embodiment that is capable of producing steady DC or poly-phase DC electricity with a minimal high frequency ripple that can easily be filtered out. This embodiment has a flywheel 21 with a plurality of ferromagnetic bars 23. It has a stator with a plurality of U-shaped magnets 33 with poles with sharp edges, each magnet having a conduction coil 37. If all conductor coils are electrically connected in parallel through diodes, poly-phase DC electricity with high frequency ripple will be generated. If the conductor coils are connected in series the sum of the voltage in all coils would be the same at all times so that steady DC electricity will be generated. The distance between the poles of a magnet and the distance between poles of adjacent magnets is equal to the length of the ferromagnetic bars. The number of magnets may be either greater than or less than, but not equal to, the number of ferromagnetic bars. In FIG. 7 there are nine magnets and ten ferromagnetic bars. The number of phases produced when the flywheel rotates is equal to the number of magnets. When the flywheel is in the position shown in FIG. 7 and is rotating clockwise, the maximum magnetic flux will be in magnet 33-1 and its coil 37-1 has the maximum electrical voltage. After the flywheel rotates 4° (360° divided by the product of the number of magnets and the number of ferromagnetic bars), the maximum magnetic flux and maximum electrical voltage will shift to magnet 33-2 and coil 37-2, respectively. The number of electric cycles (two pulses) per complete rotation of the flywheel is equal to the number of ferromagnetic bars divided by two. In the embodiment shown in FIG. 7 there are ten ferromagnetic bars; consequently, the electric cycle frequency is five times the rotational frequency. A rotation of 4° will start an electric pulse for one phase. Therefore, a rotation of 72° is needed to cause an electric cycle (two pulses) in all nine phases, or a full rotation will cause five electric cycles. FIG. 8 shows all coils 37 connected in parallel through nine diodes. With current 41-n is associated with conductor coil 37-n, FIG. 9 shows the tining of the current associated with each conductor coil and the rippled composite current 39 that results.

FIGS. 10A through 10C show an embodiment of the present invention for generating DC electricity from slow rotary motion with a different configuration of flywheel, magnet, and conductor coil than the embodiments described above. However, it still has stationary magnets and conductor coils. Magnet 20 could be a permanent magnet or an electromagnetic. It is C-shaped with a rectangular or any other appropriate cross sectional shape. One of its poles 22 is beveled to a sharp edge. The other pole is shaped to be bearing bars 24 for a disk-shaped flywheel 26. The flywheel is centered on a rotary shaft 28 that is connected to a prime mover 27. The radius of the flywheel is slightly less than the distance between the center of the rotary shaft and the edge of pole 22 to allow free rotation of the flywheel. The flywheel is composed of two materials. It has a gear-shaped member 30 made of a ferromagnetic material with the space between the teeth of the gear-shaped core is made a non-magnetic material 51. The teeth preferably have a sharp edge formed by the intersection of two planes. The purpose of the non-magnetic material is to fill space between the teeth to reduce air resistance when the flywheel rotates. The flywheel's rotary shaft 28 may be fastened to one or both bearing bars 24 by means of ring or ball bearings 53. The other end of the rotary shaft communicates with a prime mover 27 through pulleys of other means. Also there is an electric coil 34 coiled around one or more sides of magnet 20.

The ferromagnetic gear-shaped member 30 of the flywheel 26 is in contact with one pole of the magnet. For the magnet shown in FIGS. 10A through 10C, contact induction will cause a north pole at the base of the ferromagnetic gear from contact with the south pole of the magnet and a south pole in each tooth at its sharp edge. Assume that the flywheel is rotating clockwise so that in FIG. 10A, point A, then point B, and finally point C pass the edge of pole 22. When the flywheel is rotating such that point B is approaching edge of the pole the magnetic circuit will change from open to closed, or semi-closed, which leads to a maximum magnetic flux in the loop of the magnet. This change in the magnetic flux induces a growing EMF in conductor coil 34. When the flywheel continues to move so that point C approaches the end of the pole, the air gap between poles increases and the magnetic flux in the magnetic loop decreases, which induces a decreasing EMF in the conductor coil. Two teeth must pass the edge of pole 22 to induce one electric cycle. Hence the pulse frequency of the induced EMF, f, is:

$f$=number of teeth×rotational frequency of the flywheel

As a flywheel can be constructed readily with a large number of teeth, high frequency EMF can be produced with this configuration. When the flywheel has 100 teeth, an electrical frequency of 5,000 Hz can be achieved when the rotational speed is 100 cycles per second; or when the flywheel has 200 teeth, a frequency of 50 Hz can be achieved when the rotational speed of the flywheel is only 0.5 cycles per second.

Figure 11:
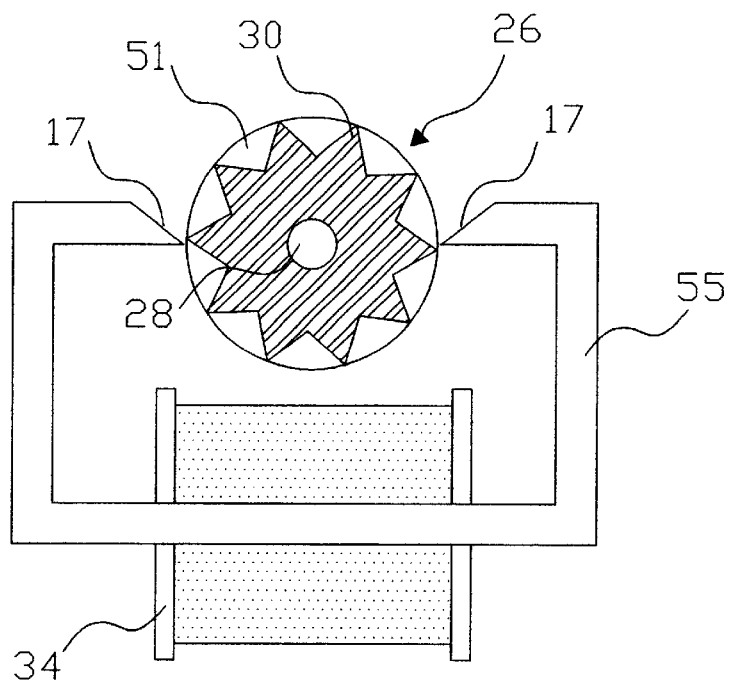
FIG. 11 is a cross sectional view of an alternative embodiment of a DC generator with one magnet and where the shaft of the flywheel rotor is not joined to the magnet.

FIG. 11 shows an alternative embodiment of a DC generator with a flywheel having a gear-shaped member. In this embodiment, C-shaped magnet 55 has two wedge-shaped poles 17. Between the two poles is the flywheel 26 with its ferromagnetic gear-shaped member 30, and non-magnetic filler material 51, rotating around shaft 28. This embodiment induces DC electricity using the same principle as the embodiment shown in FIGS. 10A through 10C. During rotation of the flywheel the approach and recession of the teeth on the ferromagnetic gear-shaped member to the poles of the magnet will close and open the magnetic circuit of the magnet to induce EMF in conductor coils 34.

Figure 12:
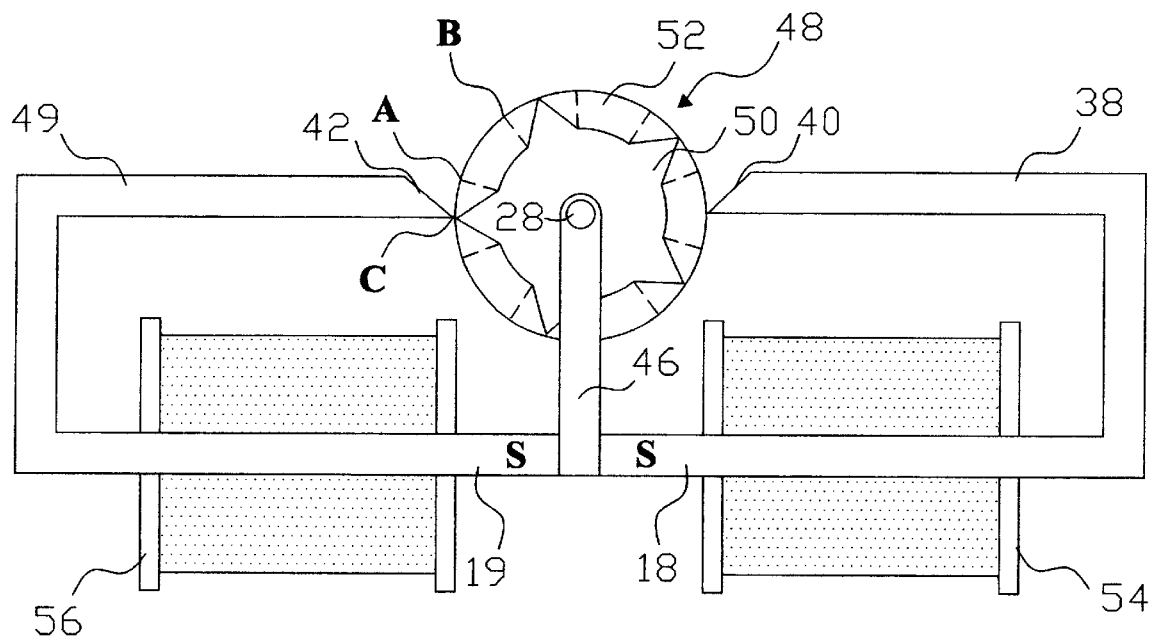
FIG. 12 is a cross sectional view of an alternative embodiment of an AC generator with two magnets and conductor coils.

FIG. 12 shows a simple form for an AC generator. This embodiment has two U-shaped magnets, 38 and 49. Each magnet has a wedge-shaped pole 40 and 42, respectively with the same polarity and poles 18 and 19 with polarity opposite to that of poles 40 and 42 attached to bearing bars 46. Each magnet has a conduction coil, 54 or 56, coiled around one of its sides. A flywheel 48 attached to a rotary shaft is positioned on the bearing bars to be between the wedge edges of poles 40 and 42. As before, the flywheel is constructed of two materials. It has ferromagnetic core with a plurality of wedge-shaped ferromagnetic teeth 50 extending outward from a circular base. The length of each tooth is one-quarter of the distance between adjacent teeth. The remainder of the flywheel is made of a non-magnetic material. The ferromagnetic teeth are positioned such that when one tooth is adjacent to a wedge-shaped pole, two teeth are equidistant from the other wedge-shaped pole. When the flywheel has rotated to the position shown in FIG. 12, the magnetic flux in magnet 49 would be at a maximum and so would the EMF induced in coil 56. On the other hand, the magnetic flux in magnet 38 would be zero. When the flywheel rotates in a counter-clockwise direction one-quarter of the angle between adjacent teeth so that point A rather than point C is opposite the edge of pole 42, the magnetic flux in magnet 49 will change from a maximum to zero to induce a half-cycle of EMF in conduction coil 56. At the same time, there will be no change in the magnetic flux in magnet 38. When the flywheel rotates an additional angle that is half of the angle between teeth, point B will be opposite the edge of pole 42 and there will be no change in the magnetic flux in magnet 49. At the same time, the magnetic flux in magnet 38 will change from zero to a maximum and back to zero to induce half a cycle of EMF in conduction coil 56. Thus at any time that is EMF induced in one or the other of the two conduction coils. To obtain a voltage in one conduction coil with a polarity opposite to the polarity of the voltage in the other conduction coil, the winding of the two coils should be in the same direction. When this is done, a sinusoidal current (AC) will be induced with a frequency equal to the product of the number of ferromagnetic teeth multiplied by the rotational frequency of the flywheel.

Figure 13:
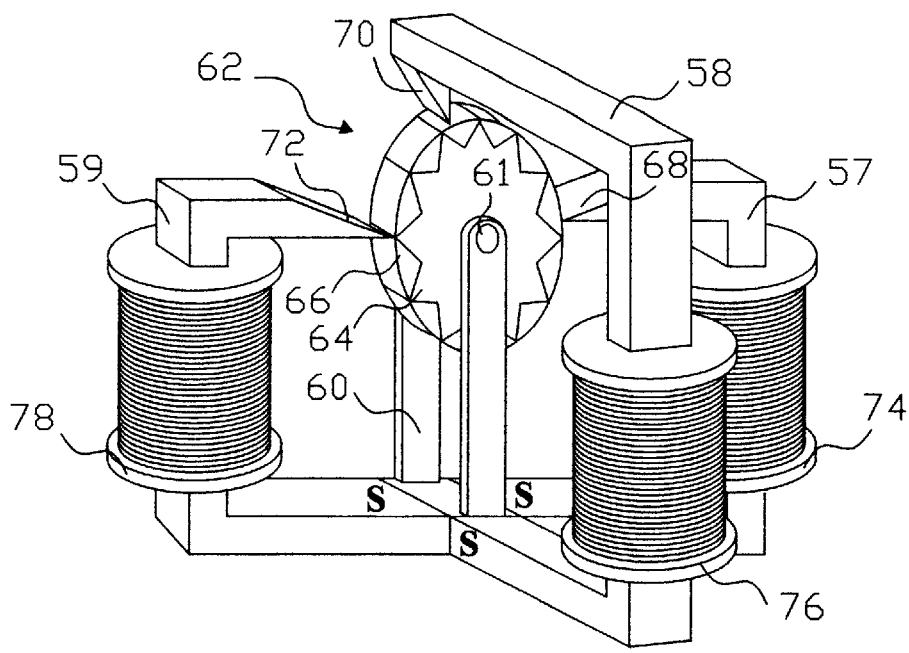
FIG. 13 is a perspective view of an alternative embodiment of a DC generator with three magnets and conductor coils.

FIG. 13 shows an embodiment of a three-phase DC generator. This embodiment has three U-shaped magnets 57, 58, and 59 with associated conduction coils 74, 76, and 78, respectively. The windings of all conduction coils are in the same direction. The same pole of each magnet (the south pole in FIG. 13) are joined and are connected to bearing bars 60. The other pole of each magnet, 68, 70, and 72, respectively are wedge-shaped. A flywheel 62 is attached to a rotary shaft 61 held in place by the bearing bars. The wedge-shaped poles are positioned at 90° increments around the flywheel so that if pole 68 is to the right of the flywheel, pole 70 is above it, and pole 72 is to the left of the flywheel. As before, flywheel contains a gear-shaped ferromagnetic member 64 and non-magnetic material 66. The number of teeth on the gear-shaped ferromagnetic member is such that when one wedge-shaped pole is opposite the edge of a tooth, a second wedge-shaped pole is one-third of the distance between teeth, and the third wedge-shaped pole is two-thirds of the distance between teeth. In the embodiment shown in FIG. 13, this condition is met with a flywheel with twelve teeth. When this condition is met the poles are separated by one-sixth of an electrical cycle. When the flywheel has rotated to the position shown, the maximum magnetic flux is in magnet 59, the flux in magnet 58 is growing and is one-third of the way to a maximum, and the magnetic flux in magnet 57 is declining and is one-third of the way to a minimum. When all conduction coils are connected in series, the sum of the voltages in all coils would be the same at all times and steady DC would result. When the conduction coils are connected in parallel through three diodes, DC electricity with a ripple results with a new pulse starting every one-sixth of an electrical cycle. The ripple frequency is given by the number of teeth multiplied by the number of magnets, multiplied by the rotational frequency of the flywheel.

Figure 14:
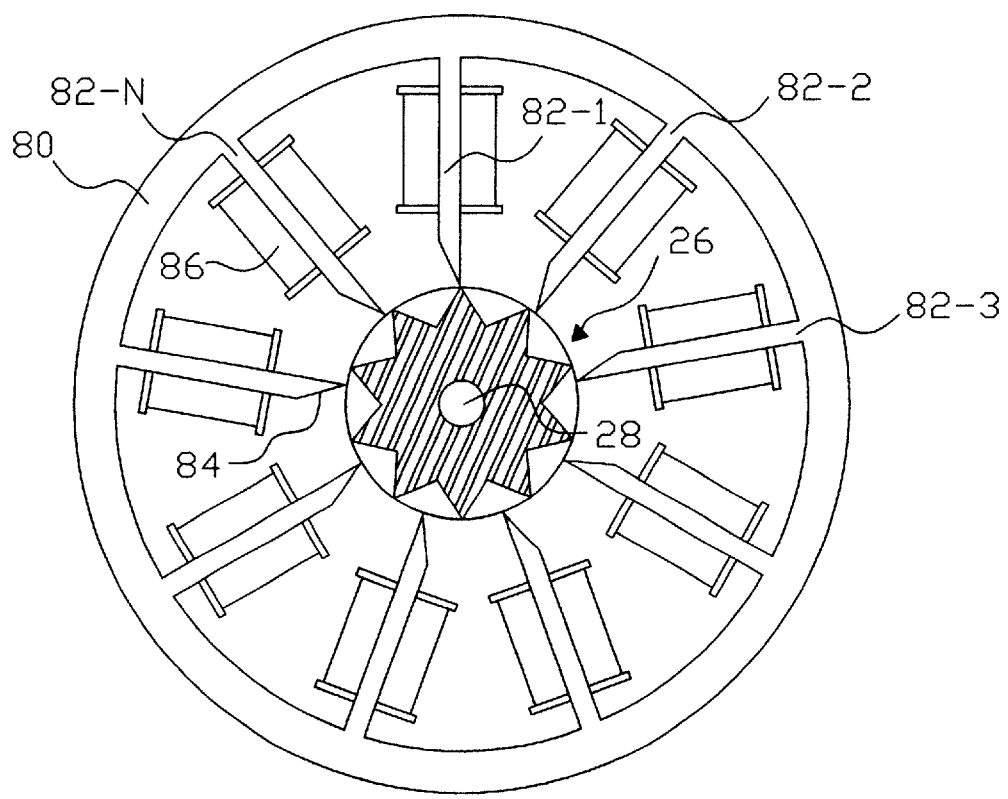
FIG. 14 is a cross sectional view of an alternative embodiment of a DC generator with radial alignment of bar magnets on a ring around a flywheel.

FIG. 14 shows another embodiment of a DC generator. This embodiment has a flywheel 26 with a gear-shaped ferromagnetic member attached to a shaft 88. The shaft is fastened to bearing bars (not shown in this drawing). Surrounding the flywheel is a ferrous ring 80 attached to the bearing bars. Attached to the ring and directed inward are a plurality of equally spaced bar magnets 82, each bar magnet having a conductor coil 86 wrapped around it and a wedge-shaped pole 84 in close proximity to the flywheel. The windings of all conductor coils should be in the same direction. To produce single-phase pulsing DC electricity, the preferred number of teeth in the gear-shaped member of the flywheel is equal to the number of bar magnets.

This embodiment can also be used to produce poly-phase DC electricity when the number of bar magnets is greater or less than the number of teeth in the gear-shaped member of the flywheel. In this case the number of phases is equal to the number of bar magnets. In the embodiment shown in FIG. 14, there are ten teeth and nine bar magnets. The edges of the wedge-shaped poles are spaced 40° apart while the teeth are spaced 36° apart. When the edge of the pole of magnet 82-1 is aligned with the edge of a tooth, the edge of the pole of magnet 82-2 is 4° beyond the edge of the next tooth, the edge of the pole of magnet 82-3 is 8° beyond the edge of the next tooth, and so on. As with the embodiment illustrated in FIG. 7, the number of electric cycles per complete rotation of the flywheel is equal to the number of teeth in the gear-shaped member of the flywheel divided by two.

FIGS. 15A through 15C show an alternative embodiment of a single phase or poly-phase DC generator. It has a shaft 90 that rotates through two sets of bearings 92 and 94. Bearing set 94 and support member 96 are made of a non-magnetic material. Positioned in a radial array around the shaft are a plurality of L-shaped magnets 98. At an end of the shaft is an attached flywheel 26 containing a gear-shaped ferromagnetic member and the other end is attached to the prime mover. An L-shaped magnet has three section; a center section parallel to the shaft, a bottom section perpendicular to the shaft near bearing set 92; and a short top section perpendicular to the shaft adjacent to the flywheel 26. The top section has a beveled edge 100. Each magnet has a conductor coil wind around any section. The end of a magnet 98 near bearing set 92 is one pole; the end near the flywheel is the other pole. This embodiment can be used to produce single-phase or poly-phase DC electricity depending upon whether the number or magnets is equal to the number of teeth on the ferromagnetic gear-shaped member of flywheel 26 (single phase) or not equal (poly-phase). This embodiment differs from the immediately preceding embodiment shown in FIG. 14 in that each magnet has its independent path for magnetic flux. The path of the magnetic flux will be from one pole of the magnet of the magnet to the flywheel to shaft 90 through the bearing set 92 to the other pole. For the embodiment shown in FIG. 14, all magnets have a common path of flux through ferromagnetic ring 80.

If the flywheel 48 of the embodiment shown in FIG. 12 is used instead of flywheel 26 of FIG. 14 or 15, and the conduction coils have opposite windings on adjacent magnets, AC electricity can be produced. Depending on the number of magnets, how they positioned around flywheel 48, and how the conduction coils are connected with each other, single phase or polyphase AC electricity can be generated.

The final embodiment of a pulsing DC generator is shown in FIGS. 16A through 16C. This embodiment has one U-shaped magnet 104 and one U-shaped ferromagnetic member 106 that has a conductor coil 108 wound around one of its sections. Between the magnet and the ferromagnetic bar is a rotating shaft 112 attached to a prime mover. Attached to the shaft is a flywheel 110 made of a non-magnetic material 114 and a ferromagnetic material in the form of bars 116 arrayed in a star-like pattern as shown in FIG. 16B along line F—F. The ends of both the magnet and the ferromagnetic bar have sharp edges as shown in FIG. 16C along line G—G. Line H—H represents the axis of rotation of the flywheel. During rotation of the flywheel, the ferromagnetic bars 116 and non-magnetic material 114 pass in succession between the sharp edges of magnet 104 and ferromagnetic member 106. When a non-magnetic portion of the flywheel passes between the sharp edges of the magnet and the U-shaped ferromagnetic member, the magnetic flux will pass through the U-shaped ferromagnetic member and cause an increasing magnetic field that induces EMF in conductor coil 108. As the flywheel continues to rotate, a ferromagnetic bar 116 on the flywheel becomes positioned between the magnet and the U-shaped ferromagnetic member. When this happens, the magnetic flux follows a short cut along the ferromagnetic bar 116, rather than reaching the U-shaped ferromagnetic member 106. This causes a declining magnetic field through the U-shaped ferromagnetic member that induces a declining EMF in the conduction coil. The wave shape and pulse frequency is similar to the embodiment shown in FIG. 10. The pulse frequency is the produce of the number of ferromagnetic bars on the flywheel and the rotational frequency of the flywheel.

What is claimed is:

1. An electric generator comprising:
   a rotating shaft connected to a source of mechanical energy;
   a flywheel with a circular surface, the flywheel attached to the rotating shaft with alternating non-magnetic material and bars of ferromagnetic material at the circular surface of the flywheel;
   a stationary array of U-shaped magnets with poles tapered to a sharp edge, with at least one pole of each magnet being in close proximity to the surface of the flywheel so that rotation of the flywheel changes magnetic flux associated with each magnet, the U-shaped magnets being oriented such that like poles of adjacent magnets are adjacent; and
   a conductor coil wound around each magnet.

2. An electric generator for generating single phase AC electricity as set forth in claim 1 wherein the distance between poles of a magnet is equal to the distance between adjacent poles of adjacent magnets and to the circumferential length of the ferromagnetic bars along the circular surface of the flywheel, and the number of magnets is an even integer multiple of the number of ferromagnetic bars.

3. An electric generator for generating poly-phase AC electricity as set forth in claim 1 wherein the magnets are grouped into sets with at least two magnets per set, the magnets in a set are on opposite sides of the flywheel, the number of phases equals to the number of sets of magnets and the number of AC cycles per shaft rotations is equal to the number of ferromagnetic bars in the flywheel.

4. An electric generator for generating pulsing DC electricity as set forth in claim 1 wherein the number of magnets is an integer multiple of the number of ferromagnetic bars, the winding of coils of adjacent magnets are in opposite directions, and wherein the distance between poles of a magnet is the same as the circumferential length of a ferromagnetic bar.

5. An electric generator for generating poly-phase DC electricity with a high ripple frequency as set forth in claim 1 wherein the distance between poles of a magnet is equal to the distance between adjacent poles of adjacent magnets and the circumferential length of a ferromagnetic bar, the conductor coils are connected in parallel, the number of magnets and ferromagnetic bars are not equal, and wherein the number of phases is equal to the number of magnets.

6. An electric generator for generating poly-phase AC electricity comprising;
   a rotating shaft connected to a source of mechanical energy;
   plural units arrayed along the rotating shaft, each unit having a flywheel with a circular surface, the flywheel attached to the rotating shaft with alternating non-magnetic material and bars of ferromagnetic material at the circular surface of the flywheel;
   a stationary array of units with at least one pole of each magnet in close proximity to the surface of the unit's flywheel, the number of AC phases is equal to the number of units and one unit is angularly displaced along the shaft relative to the next unit by an angle of 360° divided by the product of the number of phases and the number of ferromagnetic bars; and
   a conductor coil wound around each magnet.

7. An electric generator for generating DC electricity comprising:
   a rotating shaft connected to a source of mechanical energy;
   a flywheel with a circular surface, the flywheel attached to the rotating shaft, and with non-magnetic material and gear-shaped ferromagnetic material with each tooth having a sharp edge at the circular surface of the flywheel;
   a C-shaped magnet with one pole with a beveled edge close to the circular surface of the flywheel, the magnet's other pole is shaped as bearing bars, and the rotating shaft passes through the bearing bars; and
   a conductor coil wound around the magnet.

8. An electric generator for generating DC electricity comprising:
   a rotating shaft connected to a source of mechanical energy;
   a flywheel with a circular surface, the flywheel attached to the rotating shaft, and with non-magnetic material and gear-shaped ferromagnetic material with each tooth having a sharp edge at the circular surface of the flywheel;
   a C-shaped magnet with each pole having a beveled edge, the poles being adjacent to the flywheel and on opposite sides of it; and
   a conductor coil wound around the magnet.

9. An electric generator for generating AC electricity comprising:
   a rotating shaft connected to a source of mechanical energy;
   a flywheel with a circular surface, the flywheel attached to the rotating shaft, and with non-magnetic material and gear-shaped ferromagnetic material with each tooth having a sharp edge at the circular surface of the flywheel;
   two U-shaped magnets, each magnet has a pole with a beveled edge, the poles with the beveled edges have the same polarity and are adjacent to the flywheel and on opposite sides of it, the other two poles are attached to bearing bars, the rotating shaft passing through the bearing bars; and
   a conductor coil wound around each magnet.

10. An electric generator for generating AC electricity as set forth in claim 9, wherein the length of a tooth as measured along a radius passing through the tooth is one-quarter of the distance between adjacent teeth as measured along the surface of the flywheel.

11. An electric generator for generating three-phase DC electricity comprising:
    a rotating shaft connected to a source of mechanical energy;
    a flywheel with a circular surface, the flywheel attached to the rotating shaft, and with non-magnetic material and gear-shaped ferromagnetic material with each tooth having a sharp edge at the circular surface of the flywheel;
    three U-shaped magnets, one pole of each magnet has a beveled edge, the poles with the beveled edges have the same polarity and are adjacent to the flywheel, two of the three poles with the beveled edges face the flywheel from opposite directions, the third pole with a beveled edge is 90° along the circular surface of the flywheel from the other poles with the same polarity, the three poles with the other polarity are attached to bearing bars, with the rotating shaft passing through the bearing bars; and
    a conductor coil wound around each magnet.

12. An electric generator for generating single phase, DC electricity comprising:

a rotating shaft connected to a source of mechanical energy; and a flywheel with a circular surface, the flywheel attached to the rotating shaft, and with non-magnetic material and gear-shaped ferromagnetic material with each tooth having a sharp edge at the circular surface of the flywheel, the flywheel is surrounded by a ferromagnetic ring that is attached to bearing bars that are attached to the rotating shaft, bar magnets are attached to the ferromagnetic ring and directed inward, each magnet's conduction coil is wound in the same direction, each magnet has a pole with a beveled edge adjacent to the flywheel, the number of magnets being equal to the number of teeth on the ferromagnetic member of the flywheel.

13. An electric generator for generating poly-phase DC electricity as set forth in claim 12 wherein the number of magnets is not equal to the number of teeth on the gear-shaped ferromagnetic member of the flywheel.

14. An electric generator for generating DC electricity comprising:

a rotating shaft connected to a source of mechanical energy;

a flywheel with a circular surface, the flywheel attached to the rotating shaft, and with non-magnetic material and gear-shaped ferromagnetic material with each tooth having a sharp edge at the circular surface of the flywheel;

plural L-shaped magnets positioned around the periphery of the flywheel, each magnet has a short top section with a pole having a beveled edge that is adjacent to the flywheel, a middle section extending parallel to the shaft in a circular array to form a cage-like structure, and a bottom section near bearing bars that hold the rotating shaft; and a conductor coil wound around each magnet.

15. An electric generator for generating DC electricity as set forth in claim 14 wherein the number of magnets is equal to the number of teeth on the ferromagnetic member of the flywheel and the electricity generated is single phase.

16. An electric generator for generating DC electricity as set forth in claim 14 wherein the number of magnets is not equal to the number of teeth on the ferromagnetic member of the flywheel and the electricity generated is poly-phase.

17. An electric generator for generating pulsing DC electricity comprising:

a rotating shaft connected to a source of mechanical energy;

a U-shaped magnet with sharp-edged poles a U-shaped ferromagnetic member with two sharp-edged legs, each leg facing a pole of the U-shaped magnet;

a conduction coil wound around the U-shaped ferromagnetic member; and a rotor attached to the rotating shaft, the rotor having plural ferromagnetic bars extending radially outward from the shaft and non-magnetic material between the ferromagnetic bars, each ferromagnetic bar having a sharp outer edge; the rotor fitting between the U-shaped magnet and the U-shaped ferromagnetic member, the sharp outer edge of a ferromagnetic bar being between a sharp-edged pole of the magnet and a sharp edge of a leg of the ferromagnetic member periodicaly during rotation of the rotor.

* * * * *